(12) United States Patent
Huang et al.

(10) Patent No.: US 8,541,994 B2
(45) Date of Patent: Sep. 24, 2013

(54) SWITCHED-MODE POWER SUPPLY

(75) Inventors: Chen-Chih Huang, HsinChu (TW); Cheng-Pang Chan, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 317 days.

(21) Appl. No.: 12/966,355

(22) Filed: Dec. 13, 2010

(65) Prior Publication Data

US 2011/0148371 A1    Jun. 23, 2011

(30) Foreign Application Priority Data

Dec. 18, 2009    (TW) .................. 98143664 A

(51) Int. Cl.
*G05F 1/40*    (2006.01)
(52) U.S. Cl.
USPC .......................................... 323/271; 323/282
(58) Field of Classification Search
USPC ................. 323/223, 225, 268, 271, 282, 285; 363/144, 147
See application file for complete search history.

(56) References Cited

U.S. PATENT DOCUMENTS

| | | | |
|---|---|---|---|
| 7,466,113 B2* | 12/2008 | Lipcsei et al. | ................. 323/266 |
| 7,679,936 B2* | 3/2010 | Huynh et al. | ................... 363/16 |
| 2007/0159151 A1 | 7/2007 | Katoh et al. | |
| 2009/0153214 A1 | 6/2009 | Takatori | |

FOREIGN PATENT DOCUMENTS

| | | |
|---|---|---|
| CN | 101009259 A | 8/2007 |
| CN | 101272136 A | 9/2008 |
| CN | 101645658 | 2/2010 |
| TW | 200838140 | 9/2008 |
| WO | WO-2004099960 | 11/2004 |

* cited by examiner

*Primary Examiner* — Matthew Nguyen
(74) *Attorney, Agent, or Firm* — Muncy, Geissler, Olds & Lowe, PLLC

(57) ABSTRACT

A switched-mode power supply (SMPS) uses an equivalent inductor of bonding wire(s) and lead frame(s) to replace a traditional external inductor. A current-controlled pulse width modulation (PWM) modulator and a current-controlled pulse frequency modulation (PFM) modulator are optionally employed for high frequency switching, so as to mate a low inductance value of the bonding wire(s) and lead frame(s) and achieve reduced cost, low power consumption and low complexity.

38 Claims, 7 Drawing Sheets

SWITCHED-MODE POWER SUPPLY

CROSS-REFERENCES TO RELATED APPLICATIONS

This non-provisional application claims priority under 35 U.S.C. §119(a) on Patent Application No. 98143664 filed in Taiwan, R.O.C. on 2009/12/18, the entire contents of which are hereby incorporated by reference.

BACKGROUND OF THE INVENTION

1. Field of Invention

The present invention relates to a switched-mode power supply, and in particular to a switched-mode power supply without an external inductor.

2. Related Art

A switched-mode power supply (SMPS) is a power supply employing the architecture of an inductor and a field effect transistor (FET) switch, which uses magnetic coils (inductor) as an energy storage device. This type of power supply can provide the highest power conversion efficiency (up to 97%), of all direct current conversion methods, and can improve the battery life of a portable product, thus prolonging the product's working time.

Since an SMPS uses an inductor as an energy storage element, an inductance value of the energy storage inductor will directly influence efficiency. A higher inductance value can decrease the ripple and hysteresis loss generated by an SMPS, and thus an inductor of 4.7 µF, 10 µF or above is generally used.

However, larger inductor occupies larger area of a circuit board, resulting in high cost. Accordingly, as in the current trend of integrating circuits, direct fabrication of an inductor into an integrated circuit (IC) would be an excellent choice. However, a very large circuit area will be occupied if an inductor of higher than 10 nF is fully-integrated in an IC, which is not consistent with a reasonable cost and also has a low quality factor. Therefore, whether in a buck converter, a boost converter, a buck boost converter, or a Cuk converter SMPS, the inductor is implemented off-chip.

In the SMPS, the switch of an MOSFET (Metal-Oxide-Semiconductor Field-Effect Transistor) in a power stage is generally controlled by pulse width modulation (PWM) or pulse frequency modulation (PFM). The PWM method is changing the duty cycle of an MOSFET to adjust the output, without changing the cycle T of the MOSFET; and the PFM method is maintaining the duty cycle, but changing the cycle T to adjust the output. A dual-mode chip has also become available, which works in a PFM mode during low load, such as in waiting status, so as to reduce the operating frequency and thus decrease the power consumption; and is switched to operate in PWM mode during high load, so as to provide a high load current.

FIG. 1 is a schematic view of a conventional buck converter power supply 1, in which an external element 2 includes an inductor L1 and a capacitor C1 as energy storage elements, and circuit elements other than the external element 2 are generally disposed in an IC. A frequency compensation circuit 20 obtains a feedback voltage VFB via a voltage-dividing circuit formed of a resistor R1 and a resistor R2, and an error amplifier detects the change of an output voltage Vout according to a difference between the feedback voltage VFB and a reference voltage Vref, so as to generate an error signal, Vc. A comparator 14 compares the error signal Vc output from the frequency compensation circuit 20 with a triangle wave Vsaw, so as to generate a PWM output VDUTY. A driver embodied by a non-overlap clock generator 12 then generates two non-overlap clock signals according to the PWM output VDUTY, so as to control the upper and lower bridge switches P1 and N1 in a power stage 18, and generate an output current to charge and discharge the inductor L1 and the capacitor C1, thus supplying an output voltage Vout to a load RL.

In a current PWM modulator or PFM modulator, a comparator-based design is generally employed, in which the PWM modulator is generally a circuit including a comparator and a triangle wave; and the PFM modulator is a circuit including an SR latch circuit and a comparator. The inductance value of an external inductor L1 is correlated with the operating frequency of a power supply, and when the inductor L1 has a high inductance value, the power supply can operate at a lower frequency; on the contrary, when the inductor L1 has a low inductance value, the power supply needs to operate at a higher frequency.

SUMMARY OF THE INVENTION

The present invention provides several embodiments of SMPSes without an external inductor.

According to an embodiment of the present invention, an SMPS is provided, which supplies an output current to charge an external capacitor to generate an output voltage. The SMPS includes a first bonding wire, a second bonding wire, and a power conversion chip. The power conversion chip includes a first pad, connected to an end of the first bonding wire; a second pad, connected to an end of the second bonding wire; a frequency compensation circuit, electrically coupled to the second pad, for acquiring a feedback voltage, and outputting an error signal according to a reference voltage and the feedback voltage; a current-controlled PWM modulator, electrically coupled to the frequency compensation circuit, for generating a high-frequency PWM output signal according to the error signal and a high-frequency clock signal; a current-controlled PFM modulator, electrically coupled to the frequency compensation circuit, for generating a high-frequency PFM output signal according to the error signal; a power stage, switched under control to output the output current from a switch node connected to the first pad; a selector, electrically coupled to the current-controlled PWM modulator and the current-controlled PFM modulator, for enabling the current-controlled PWM modulator or the current-controlled PFM modulator according to a selection signal; and a driver, electrically coupled to the power stage, the current-controlled PWM modulator and the current-controlled PFM modulator, for controlling the power stage switch according to the PWM output signal or the PFM output signal. The first bonding wire is electrically coupled to the other end of the second bonding wire, and connected directly to an end of the external capacitor.

According to another embodiment of the present invention, an SMPS is provided, which supplies an output current to charge an external capacitor to generate an output voltage. The SMPS includes a first bonding wire, a second bonding wire, and a power conversion chip. The power conversion chip includes a first pad, connected to an end of the first bonding wire; a second pad, connected to an end of the second bonding wire; a frequency compensation circuit, electrically coupled to the second pad, for acquiring a feedback voltage, and outputting an error signal according to a reference voltage and the feedback voltage; a current-controlled PWM modulator, electrically coupled to the frequency compensation circuit, for generating a high-frequency PWM output signal according to a high-frequency clock signal and the error signal; a power stage, switched under control to output the output current from a switch node connected to the first pad; and a driver, electrically coupled to the power stage and the current-controlled PWM modulator, for controlling the power stage switch according to the PWM output signal. The first bonding wire is electrically coupled to the other end of the second bonding wire, and connected directly to an end of the external capacitor.

According to another embodiment of the present invention, an SMPS is provided, which supplies an output current to charge an external capacitor to generate an output voltage. The SMPS includes a first bonding wire, a second bonding wire, and a power conversion chip. The power conversion chip includes a first pad, connected to an end of the first bonding wire; a second pad, connected to an end of the second bonding wire; a frequency compensation circuit, electrically coupled to the second pad, for acquiring a feedback voltage, and outputting an error signal according to a reference voltage and the feedback voltage; a current-controlled PFM modulator, electrically coupled to the frequency compensation circuit, for generating a high-frequency PFM output signal according to the error signal; a power stage, switched under control to output the output current from a switch node connected to the first pad; and a driver, electrically coupled to the power stage and the current-controlled PFM modulator, for controlling the power stage switch according to the PFM output signal. The first bonding wire is electrically coupled to the other end of the second bonding wire, and connected to an end of the external capacitor.

In another embodiment, the current-controlled PWM modulator includes a voltage-to-current converter and an inverter. The voltage-to-current converter converts and generates a corresponding PWM control current according to the error signal, and the PWM control current pulls down the inverter strongly or weakly, to generate a PWM output signal.

Preferably, the current-controlled PWM modulator further includes a current mirror and a buffer. The current mirror mirrors the PWM control current, so as to pull down the inverter strongly or weakly, and the buffer buffers and outputs the PWM output signal.

In another embodiment, the current-controlled PFM modulator includes a voltage-to-current converter, a current mirror, and a current-starved voltage-controlled oscillator (VCO). The voltage-to-current converter converts and generates a corresponding PFM control current according to the error signal, the current mirror mirrors the PFM control current, so as to be provided to the current-starved VCO, and the current-starved VCO outputs PFM output signals with different frequencies according to the magnitude of the PFM control current. Preferably, a buffer is further included to buffer and output the PFM output signal.

The SMPS proposed in each of the embodiments of the present invention is capable of high-frequency switching, and thus can use a parasitic inductor provided by bonding wires and lead frame as energy storage inductors without an external inductor, thereby reducing the cost.

The detailed features and advantages of the present invention are described below in great detail through the following embodiments, and the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description and accompanying drawings given herein below for illustration only, and thus not limitative of the present invention wherein.

DETAILED DESCRIPTION OF THE INVENTION

In the present invention, bonding wires and lead frames are directly used as external inductors, so as to reduce the cost of an external circuit. However, the conventional SMPS cannot directly use bonding wires as external inductors, as the conventional SMPS is embodied with a comparator-based architecture, and can only operate at a switch frequency between 500 kHz to 10 MHz. Since the inductance value provided by the bonding wires including lead frame is only nH order, a power stage must be switched with a frequency far greater than 10 MHz. The conventional power supply with the comparator-based architecture cannot reach such a high frequency.

Therefore, the embodiment of the present invention provides a current-controlled PWM modulator and a current-controlled PFM modulator, which are digitally switched to provide a frequency far greater than 10 MHz.

Figure 1:
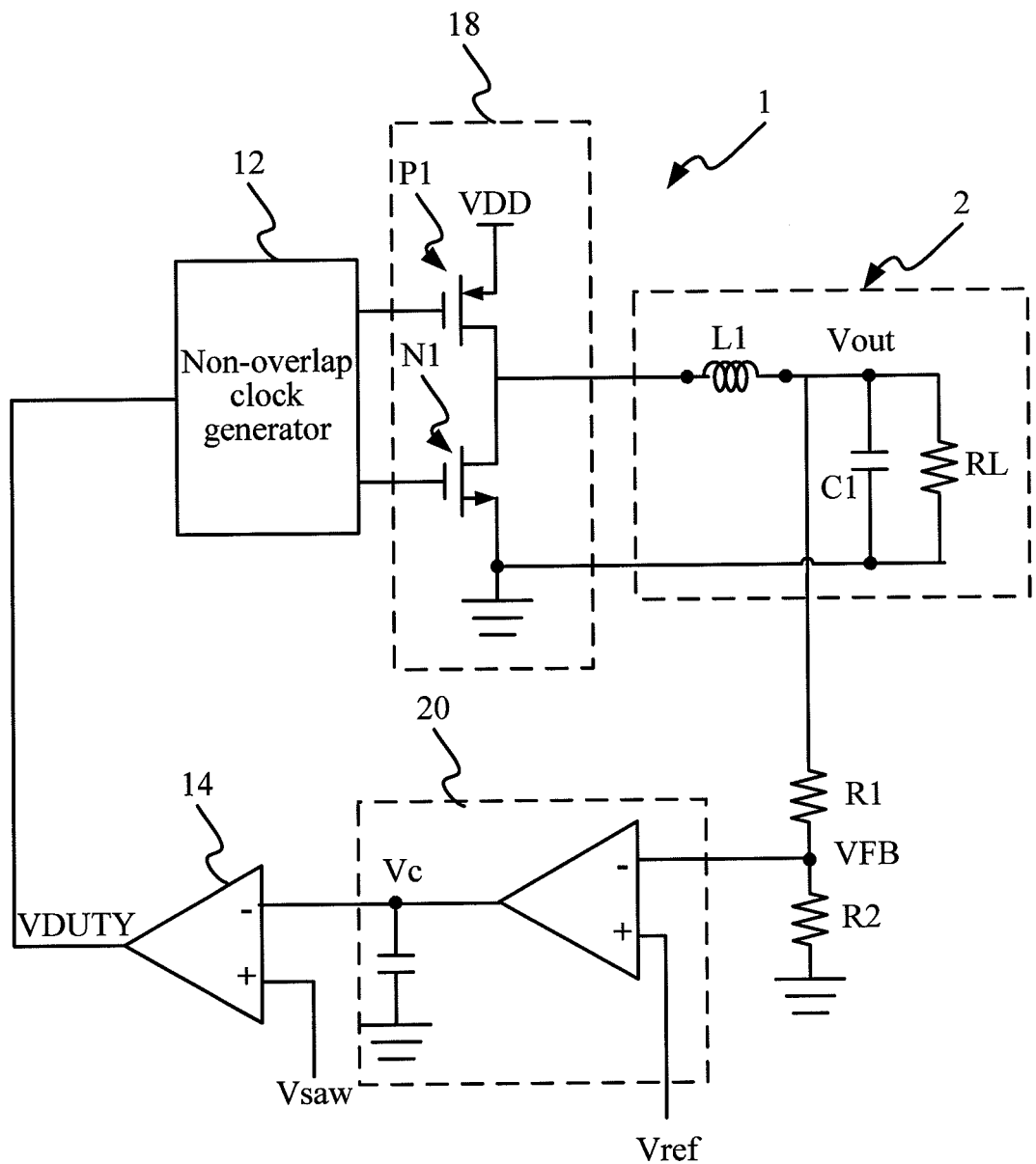
FIG. 1 is a schematic view of a prior art SMPS.
Figure 2A:
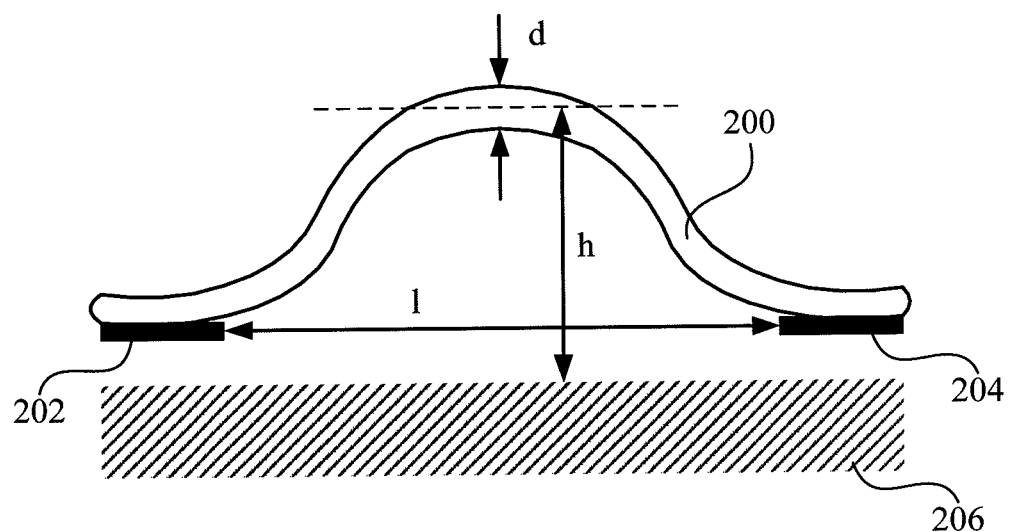
FIGS. 2A and 2B show a bonding wire and an equivalent circuit model thereof.
Figure 2B:
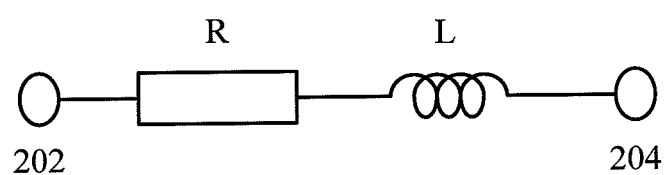

In the first place, the bonding wire may be defined according to a bonding wire shown in FIG. 2A and an equivalent model shown in FIG. 2B. A bonding wire 200 is bonded between pads 202 and 204, where an inductance value thereof is expressed by L, a wire diameter is expressed by d, a wire length is expressed by l, and a height is expressed by h (distance between the bonding wire 200 and a substrate 206). A calculation formula of the inductance value L is given as follows:

$$L = \frac{\mu_0}{2\pi} \cdot l \left[ \ln\left\{ \frac{2l}{d} + \sqrt{1 + \left(\frac{2l}{d}\right)^2} \right\} + \frac{d}{2l} - \sqrt{1 + \left(\frac{d}{2l}\right)^2} + c \right]$$

in which, capacitance C is a function of frequency, and δ is a skin depth of a material.

$$c = \frac{\mu_r}{4} \cdot \tanh\left(\frac{4\delta}{d}\right)$$

$$\delta = \frac{1}{\sqrt{\pi \cdot \sigma \cdot f \cdot \mu_0 \cdot \mu_r}}$$

Generally, an inductance value provided by a bonding wire is about 1 nH to 10 nH. Therefore, the operating frequency of the SMPS according to the embodiment of the present invention is approximately within the range of 100 MHz to 400

MHz. Note that, in this invention, not only bonding wires but also lead frames contribute certainly equivalent inductance.

Figure 3:
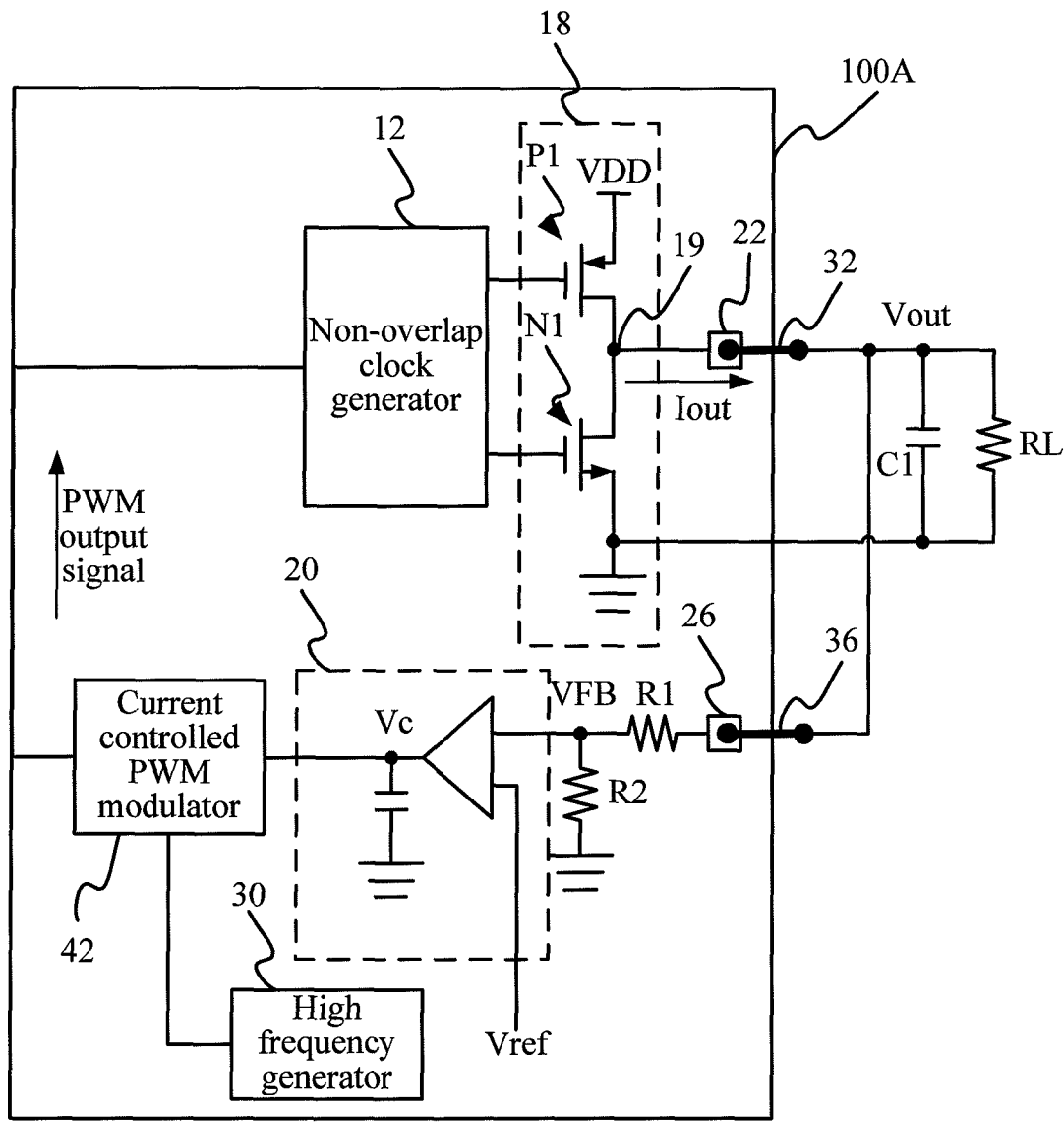
FIG. 3 is a schematic view of an SMPS according to an embodiment of the present invention.

FIG. 3 is a schematic view of an SMPS according another embodiment of the present invention, in which a current-controlled PWM modulator is employed. A capacitor C1 and a load RL are connected in parallel, with no external inductor disposed in an output path of a power conversion chip 100A; and an output current Iout directly charges and discharges the capacitor C1 via a pad 22 and a bonding wire 32, so as to generate an output voltage Vout. A bonding wire 36 is connected directly to the output voltage Vout, so as to provide the output voltage Vout to a pad 26; and resistors R1 and R2 divide the output voltage Vout, so as to provide a feedback voltage VFB for PWM control. In this embodiment, the pads 22 and 26 are both connected directly to the capacitor C1 via bonding wires 32 and 36, and the parasitic inductors of the bonding wires 32 and 36 are used as energy storage inductors. A frequency compensation circuit 20 compares the feedback voltage VFB with a reference voltage Vref to output error signal Vc, a current-controlled PWM modulator 42 then outputs a high-frequency PWM output signal to a non-overlap clock generator 12 according to the error signal Vc and a high-frequency clock signal provided by a high frequency generator 30. Next, the non-overlap clock generator 12 generates two non-overlap control signals to a power stage 18 according to the PWM output signal, so as to switch an upper and lower bridge switches P1 and N1 in the power stage 18. The power stage 18 is switched under control to generate the output current Iout, which charges and discharges the capacitor C1 through a switch node 19, the pad 22, and the bonding wire 32, so as to generate the output voltage Vout. As described previously, an inductance value provided by the bonding wire 32 and the bonding wire 36 is from 1 nH and to 10 nH, and thus the frequency of the PWM output signal output from the current-controlled PWM modulator 42 is between 100 MHz and 400 MHz. In a practical circuit, the bonding wires 32 and 36 may bond the pad and a lead frame (not shown) together, and then connected to the capacitor C1 via a pin of the lead frame. Therefore, in other embodiments, parasitic inductance and capacitance caused by the lead frame may also be taken into consideration.

Figure 4A:
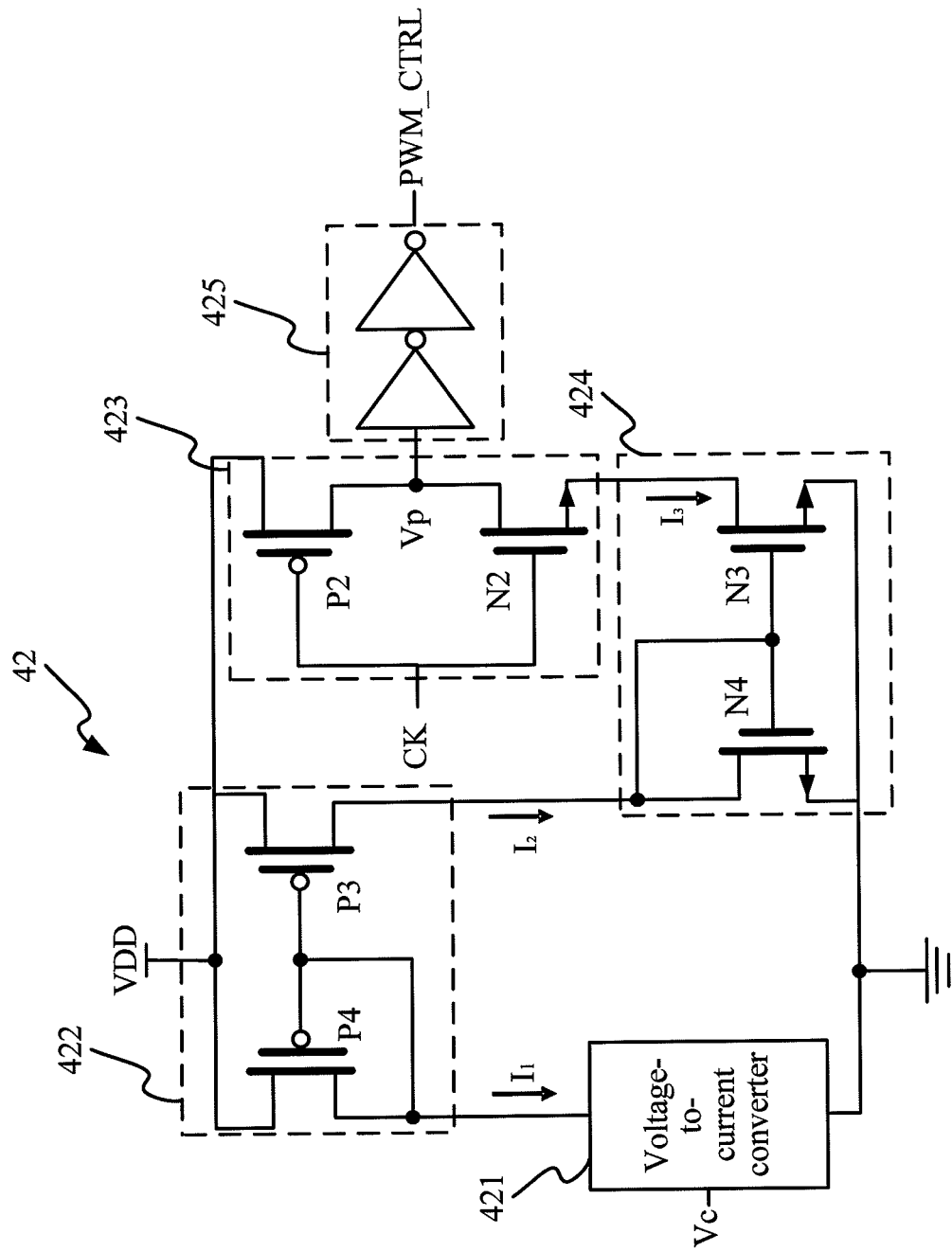
FIG. 4A is a circuit diagram of a current-controlled PWM modulator according to an embodiment of the present invention.
Figure 4B:
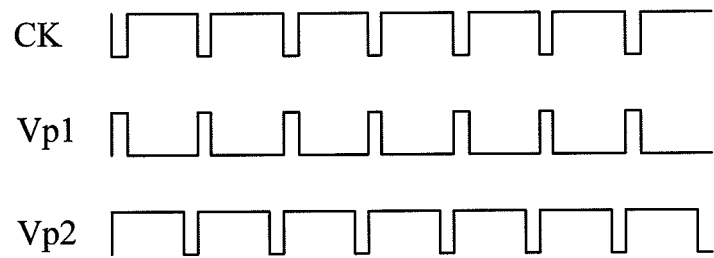
FIG. 4B is an oscillogram of a high-frequency clock signal and an output signal in the embodiment as shown in FIG. 4A.

FIG. 4A is a circuit diagram of a current-controlled PWM modulator according to another embodiment of the present invention. An inverter 423 is formed by serially connected transistors P2 and N2, and switches under the control of a clock signal CK to generate a signal Vp at an output end thereof; in which the clock signal CK is a high-frequency clock signal provided by a high frequency generator 30, as shown in FIG. 3. A voltage-to-current converter 421 converts and generates a PWM control current $I_1$ according to an error signal Vc, a first current mirror 422 mirrors the PWM control current $I_1$ to generate a converted current $I_2$, and then a second current mirror 424 mirrors the converted current $I_2$ to generate a current $I_3$ to the inverter 423. When an output voltage Vout is higher than Vref, the error signal Vc increases, the PWM control current $I_1$ generated by the voltage-to-current converter 421 increase, and thus the current $I_3$ also increases to pull down the output of the inverter 423 strongly. In this case, the signal Vp decreases rapidly and its pulse width is decreased; here a corresponding waveform output from the inverter 423 is a waveform Vp1 as shown in FIG. 4B. When the output voltage Vout is lower than Vref, the PWM control current $I_1$ decreases, and the current $I_3$ is also decreased to pull down the output of the inverter weakly. So the signal Vp decreases slowly and its pulse width is increased; here a corresponding waveform output from the inverter 423 is a waveform Vp2 as shown in FIG. 4B. A buffer 425 is connected to the inverter 423 for buffering, and outputs the PWM output signal (PWM_CTRL).

Figure 5:
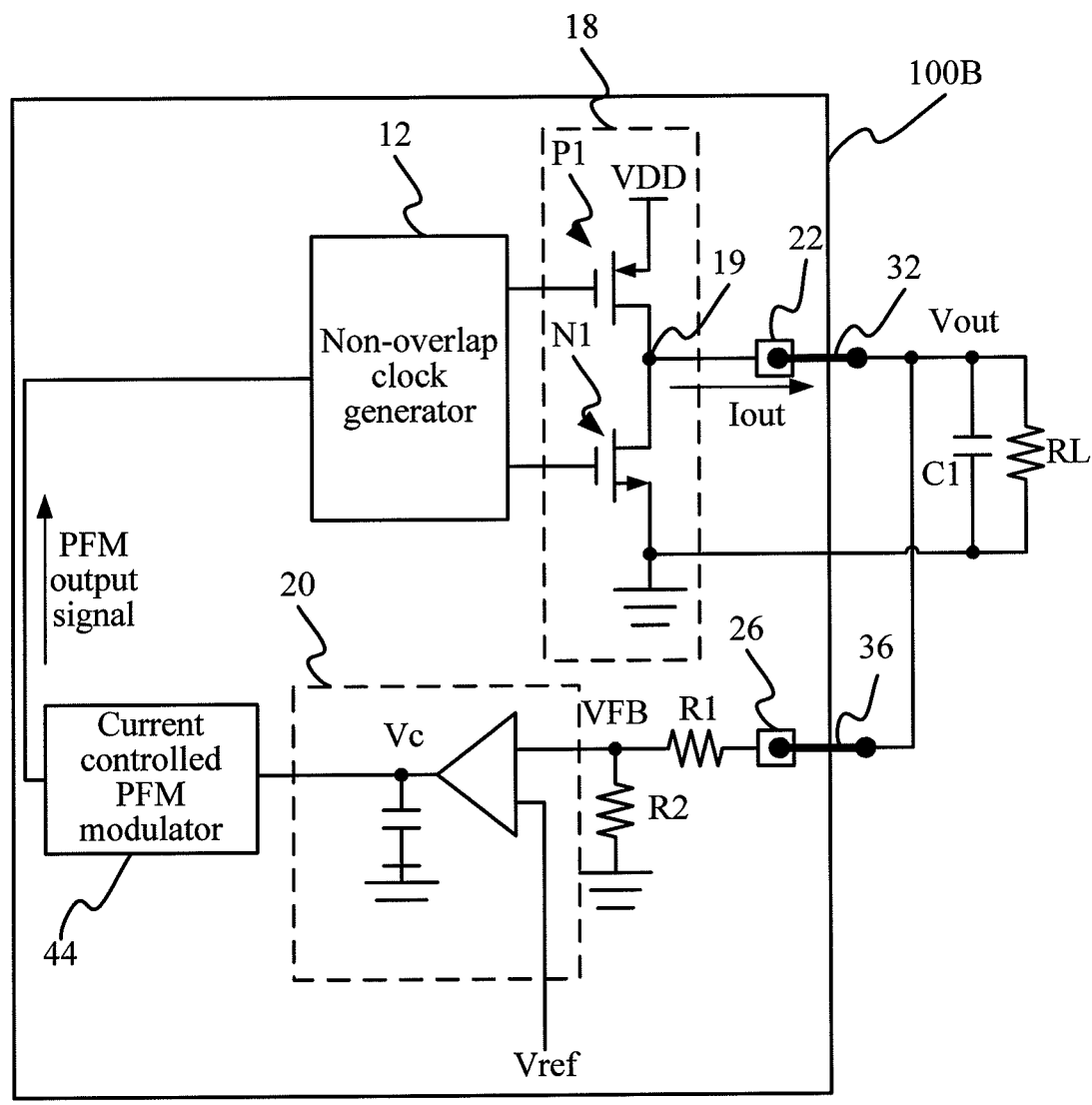
FIG. 5 is a schematic view of an SMPS according to another embodiment of the present invention.

FIG. 5 is a schematic view of an SMPS according to another embodiment of the present invention. Similar to the embodiment shown in FIG. 3, a power conversion chip 100B is connected directly to an external capacitor C1 via bonding wires 32 and 36, and uses parasitic inductors of bonding wires 32 and 36 as energy storage inductors; thus, a current-controlled PFM modulator 44 thereof also needs to output a high-frequency PFM control signal. In this embodiment, the current-controlled PFM modulator 44 does not need an additionally provided high-frequency clock signal, so that the high frequency generator does not need to be installed. The current-controlled PFM modulator 44 is electrically coupled between a frequency compensation circuit 20 and a driver embodied by a non-overlap clock generator 12, and generates a high-frequency PFM output signal according to an error signal Vc. Accordingly, the non-overlap clock generator 12 controls the switch of a power stage 18 to generate an output current Iout. The output current Iout is output from a switch node 19 to charge and discharge the external capacitor C1, thereby generating an output voltage Vout.

Figure 6:
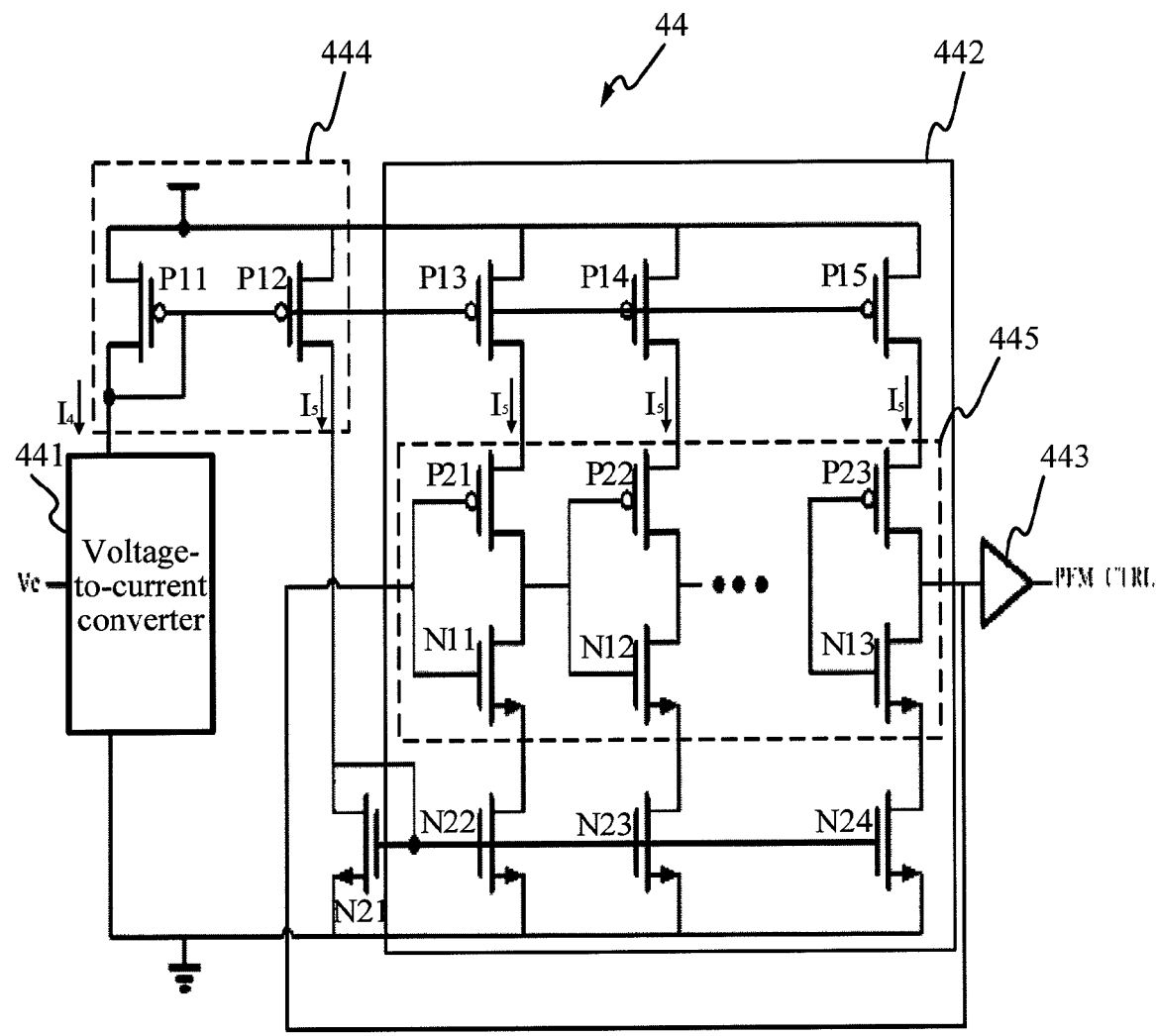
FIG. 6 is a circuit diagram of a current-controlled PFM modulator according to another embodiment of the present invention.

FIG. 6 is a circuit diagram of a current-controlled PFM modulator 44 according to another embodiment of the present invention. A voltage-to-current converter 441 generates a corresponding PFM control current $I_4$ according to an error signal Vc; a current mirror 444 is connected between the voltage-to-current converter 441 and a current-starved VCO 442, mirrors the PFM control current $I_4$ and generates a current $I_5$. The current-starved VCO 442 includes a ring oscillator with odd stages, and outputs an output signal with a fixed duty cycle and a changeable cycle according to the magnitude of the current $I_5$. The buffer 443 is connected to an output end of the current-starved VCO 442, for buffering and outputting a PFM control signal PFM_CTRL.

In order to have high efficiency at heavy load (the load current is larger or around 1 A) or a light load (load current <100 mA), the present invention also provides an SMPS with PWM/PFM dual mode.

Figure 7:
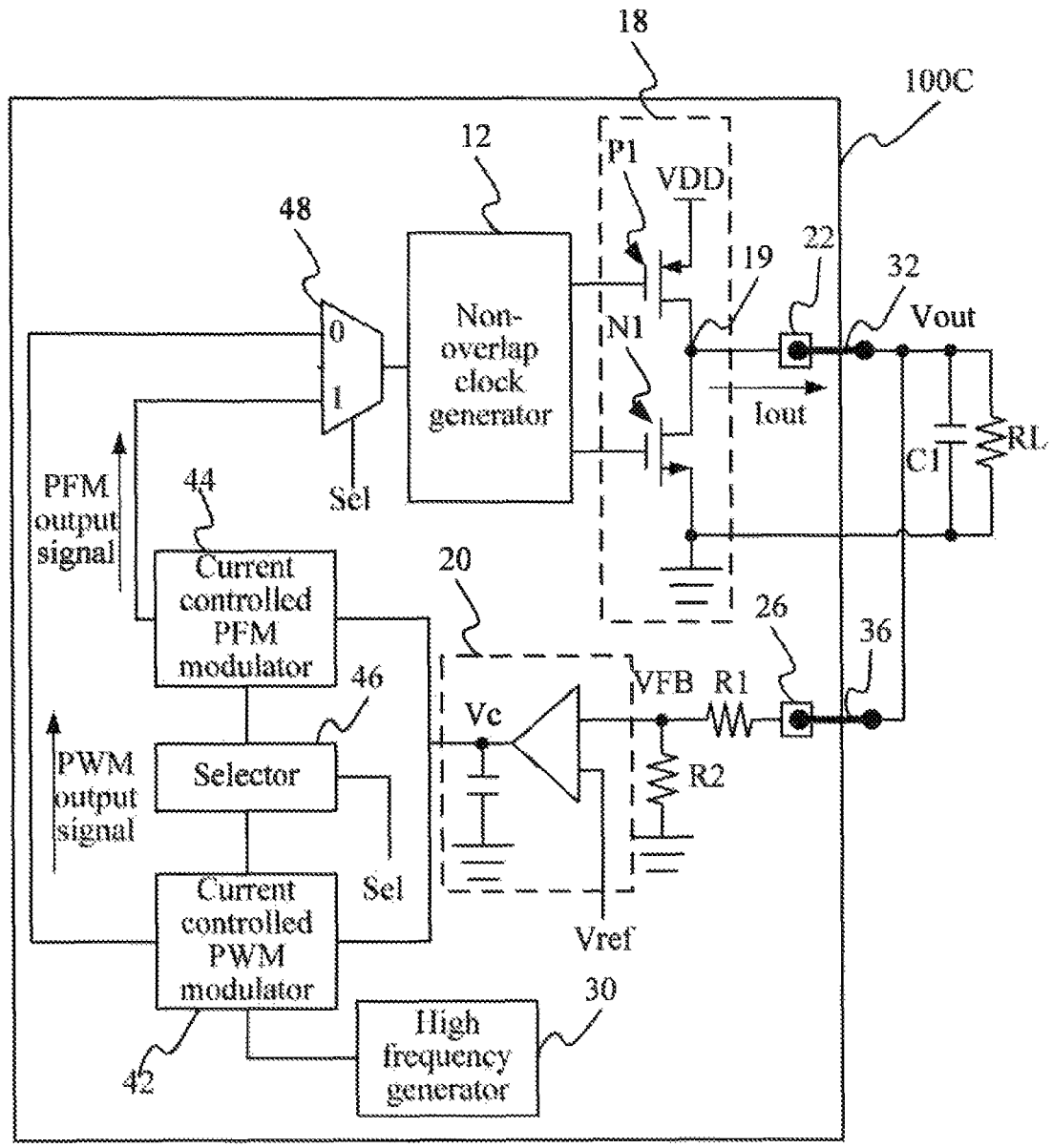
FIG. 7 is a schematic view of an SMPS according to another embodiment of the present invention.

FIG. 7 is a schematic view of another embodiment of an SMPS according to the present invention, which has both a current-controlled PWM modulator 42 and a current-controlled PFM modulator 44. A selector 46 is electrically coupled to the current-controlled PWM modulator 42 and the current-controlled PFM modulator 44, and enables the current-controlled PWM modulator 42 or the current-controlled PFM modulator 44 according to a selection signal Sel. A multiplexer 48 is electrically coupled to the current-controlled PWM modulator 42 and the current-controlled PFM modulator 44, and also switches according to the selection signal Sel to provide a PWM output signal or a PFM output signal to a non-overlap clock generator 12. The selection signal Sel is provided externally, and can be determined by detecting the change at an output end; for example, it is determined to work in a PFM or PWM mode when an output current Iout or an output voltage Vout is risen to or dropped to a threshold value.

Please refer to FIG. 2B for an equivalent circuit model of a bonding wire. In fact the bonding wire also has the property of a resistor, and thus it is preferred that the properties of resistors, inductors and capacitors in the whole path through the pad 22, the bonding wire 32, the output end, the bonding wire 36 to the pad 26 are all taken into consideration when determining the operating frequency of the SMPS.

As described previously, the bonding wire 36 and the bonding wire 32 may be bound between a pad and a lead frame. In an embodiment, the bonding wire 36 and the bonding wire 32 are connected to the capacitor C1 via a common pin on the lead frame after being connected to the same lead frame. In another embodiment, the bonding wire 36 and the bonding wire 32 are respectively connected to a first pin and a second pin, and then the first pin and the second pin are electrically connected to the capacitor C1 via an external PCB (Printed Circuit Board).

Although in the above embodiments, only one single bonding wire is used to embody each of the bonding wires 32 and 36 respectively, multiple bonding wires may also be employed to embody the bonding wire 32/36 so that the electrical properties provided by the bonding wires may be precisely controlled. In general description, the independent bonding wires 32 and 36 separate from each other may be defined as a first bonding wire and a second bonding wire according to the aforesaid embodiments of the present invention.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A switched-mode power supply (SMPS) for supplying an output current to charge an external capacitor to generate an output voltage, comprising:
    a first bonding wire;
    a second bonding wire; and
    a power conversion chip, comprising:
        a first pad connected to an end of the first bonding wire;
        a second pad connected to an end of the second bonding wire;
        a frequency compensation circuit coupled to the second pad to acquire a feedback voltage, and outputting an error signal according to a reference voltage and the feedback voltage;
        a current-controlled pulse width modulation (PWM) modulator electrically coupled to the frequency compensation circuit, generating a high-frequency PWM output signal according to the error signal and a high-frequency clock signal;
        a current-controlled pulse frequency modulation (PFM) modulator electrically coupled to the frequency compensation circuit, generating a high-frequency PFM output signal according to the error signal;
        a power stage, switching under control to output the output current from a switch node, the switch node connected to the first pad;
        a selector electrically coupled to the current-controlled PWM modulator, and the current-controlled PFM modulator, activating the current-controlled PWM modulator or the current-controlled PFM modulator according to a selection signal; and
        a driver electrically coupled to the power stage, the current-controlled PWM modulator and the current-controlled PFM modulator, controlling the switching of the power stage according to the PWM output signal or the PFM output signal;
    wherein the first bonding wire is electrically coupled to the other end of the second bonding wire, and electrically connected to an end of the external capacitor.

2. The SMPS according to claim 1, wherein the driver is a non-overlap clock generator that generates two non-overlap control signals to the power stage according to the PFM output signal or the PWM output signal respectively.

3. The SMPS according to claim 1 further comprising a high frequency generator that generates the high-frequency clock signal to the current-controlled PWM modulator.

4. The SMPS according to claim 1, wherein a frequency of the PWM output signal or the PFM output signal is higher than 10 MHz.

5. The SMPS according to claim 1, wherein a frequency of the PWM output signal or the PFM output signal is within a range of 100 MHz to 400 MHz.

6. The SMPS according to claim 1, wherein an equivalent inductance value provided by any of the first bonding wire and the second bonding wire is within a range of 1 nH to 10 nH.

7. The SMPS according to claim 1, wherein the current-controlled PWM modulator comprises:
    an inverter, having an input end receiving the high-frequency clock signal and an output end outputting the PWM output signal; and
    a voltage-to-current converter electrically coupled to the frequency compensation circuit, converting the error signal into a PWM control current, wherein the PWM control current pulls down the inverter strongly or weakly in response to a magnitude of the error signal, so as to change a duty cycle of the PWM output signal.

8. The SMPS according to claim 7 further comprising a buffer, the buffer being connected to the output end of the inverter and buffering the PWM output signal.

9. The SMPS according to claim 7, wherein the current-controlled PWM modulator further comprises:
    a first current mirror electrically coupled to the voltage-to-current converter, mirroring the PWM control current to generate a converted current; and
    a second current mirror, having an input end electrically coupled to an output end of the first current minor and an output end electrically coupled to the inverter, the second current mirror mirroring the converted current to pull down the inverter strongly or weakly.

10. The SMPS according to claim 1, wherein the current-controlled PEW modulator comprises:
    a voltage-to-current converter electrically coupled to the frequency compensation circuit, converting and generating a PFM control current according to the error signal;
    a current minor electrically coupled to the voltage-to-current converter, generating a converted current according to the PFM control current; and
    a current-starved voltage-controlled oscillator (VCO) connected to the current mirror, generating the PFM output signal according to the converted current.

11. The SMPS according to claim 10, further comprising a buffer, the buffer being connected to the current-starved VCO and buffering the PFM output signal.

12. The SMPS according to claim 10, wherein the current-starved VCO comprises a ring oscillator with odd stages.

13. The SNIPS according to claim 1 further comprising a lead frame, Wherein the other ends of the first bonding wire and the second bonding wire are bonded to the lead frame, and connected directly to the external capacitor via a common pin on the lead frame.

14. The SMPS according to claim 1 further comprising a lead frame, wherein the other ends of the first bonding wire and the second bonding wire are bonded to the lead frames, and connected directly to the external capacitor respectively via a first pin and a second pin on the lead frame.

15. The SMPS according to claim 1, wherein the first bonding wire or the second bonding wire is formed of a plurality of bonding wires.

16. A switched-mode power supply (SPMS) for supplying an output current to charge an external capacitor to generate an output voltage, and comprising:
 a first bonding wire;
 a second bonding wire; and
 a power conversion chip, comprising:
  a first pad, connected to an end of the first bonding wire;
  a second pad, connected to an end of the second bonding wire;
  a frequency compensation circuit, electrically coupling to the second pad to acquire a feedback voltage, and outputting an error signal according to a reference voltage and the feedback voltage;
  a current-controlled pulse width modulation (PWM) modulator electrically coupled to the frequency compensation circuit, generating a high-frequency PWM output signal according to a high-frequency clock signal and the error signal;
  a power stage switching under control to output the output current from a switch node connected to the first pad; and
  a driver electrically coupled to the power stage and the current-controlled PWM modulator, controlling the switching of the power stage according to the PWM output signal;
 wherein the first bonding wire is electrically coupled to the other end of the second bonding wire, and electrically connected to an end of the external capacitor.

17. The SMPS according to claim 16, wherein the driver is a non-overlap clock generator that generates two non-overlap control signals to the power stage according to the PWM output signal.

18. The SMPS according to claim 16, further comprising a high frequency generator that generates a high-frequency clock signal to the current-controlled PWM modulator.

19. The SMPS according to claim 16, wherein a frequency of the PWM output signal is higher than 10 MHz.

20. The SMPS according to claim 16, where frequency of the PWM output signal is within a range of 100 MHz to 400 MHz.

21. The SMPS according to claim 16, wherein an equivalent inductance value is provided by any of the first bonding wire and the second bonding wire is within a range of 1 nH to 10 nH.

22. The SMPS according to claim 16, wherein the current-controlled PWM modulator comprises:
 an inverter, having an input end receiving the high-frequency clock signal, and an output end outputting the PWM output signal; and
 a voltage-to-current converter electrically coupled to the frequency compensation circuit, for converting the error signal into a PWM control current, wherein the PWM control current pulls down the inverter strongly or weakly in response to a magnitude of the error signal, so as to change a duty cycle of the PWM output signal.

23. The SMPS according to claim 22 further comprising a buffer, the buffer being connected to the output end of the inverter and buffering the PWM output signal.

24. The SMPS according to claim 22, further comprising:
 a first current mirror electrically coupled to the voltage-to-current converter, mirroring the PWM control current to generate a converted current; and
 a second current mirror, having an input end electrically coupled to an output end of the first current mirror, and an output end electrically coupled to the inverter, the second current mirror mirroring the converted current to pull down the inverter strongly or weakly.

25. The SMPS according to claim 16, further comprising a lead frame, wherein the other ends of the first bonding wire and the second bonding wire are bonded to the lead frame, and connected directly to the external capacitor via a common pin on the lead frame.

26. The SMPS according to claim 16 further comprising a lead frame, wherein the other ends of the first bonding wire and the second bonding wire are bonded to the lead frames, and connected directly to the external capacitor respectively via a first pin and a second pin on the lead frame.

27. The SMPS according to claim 16, wherein the first bonding wire or the second bonding wire is formed of a plurality of bonding wires.

28. A switched-mode power supply (SMPS) for supplying an output current to charge an external capacitor to generate an output voltage, and comprising:
 a first bonding wire;
 a second bonding wire; and
 a power conversion chip, comprising:
  a first pad, connected to an end of the first bonding wire;
  a second pad, connected to an end of the second bonding wire;
  a frequency compensation circuit, electrically coupling to the second pad to acquires a feedback voltage, and outputting an error signal according to a reference voltage and the feedback voltage;
  a current-controlled pulse frequency modulation (PFM) modulator electrically coupled to the frequency compensation circuit, generating a high-frequency PFM output signal according to the error signal;
  a power stage, switching under control to output the output current from a switch node connected to the first pad; and
  a driver electrically coupled to the power stage and the current-controlled PFM modulator, controlling the switching of the power stage according to the PFM output signal;
 wherein the first bonding wire is electrically coupled to the other end of the second bonding wire, and electrically connected to an end of the external capacitor.

29. The SMPS according to claim 28, wherein the driver is a non-overlap clock generator that generates two non-overlap control signals to the power stage according to the PFM output signal.

30. The SMPS according to claim 28, wherein an equivalent inductance value provided by any of the first bonding wire and the second bonding wire is within a range of 1 nH to 10 nH.

31. The SMPS according to claim 28, wherein a frequency of the PFM output signal is higher than 10 MHz.

32. The SNIPS according to claim 28, wherein a frequency of the PFM output signal is within a range of 100 MHz to 400 MHz.

33. The SMPS according to claim 28, wherein the current-controlled PFM modulator comprises:
 a voltage-to-current converter electrically coupled to the frequency compensation circuit, converting and generating a PFM control current according to the error signal;
 a current-starved voltage-controlled oscillator (VCO), generating the PFM output signal according to the PFM control current; and a buffer connected to the current-starved VCO, buffering the PFM output signal from the current-starved VCO.

34. The SMPS according to claim 33 further comprising a current mirror, the current mirror electrically coupling to the voltage-to-current converter and mirroring the PFM control current to generate a converted current to the current-starved VCO.

35. The SMPS according to claim 33, wherein the current-starved VCO comprises a ring oscillator with odd stages.

36. The SMPS according to claim 28, further comprising a lead frame, wherein the other ends of the first bonding wire and the second bonding wire are bonded to the lead frame, and connected directly to the external capacitor via a common pin on the lead frame.

37. The SMPS according to claim 28, further comprising a lead frame, wherein the other ends of the first bonding wire and the second bonding wire are bonded to the lead frame, and connected directly to the external capacitor respectively via a first pin and a second pin on the lead frame.

38. The SMPS according to claim 28, wherein the first bonding wire or the second bonding wire is formed of a plurality of bonding wires.

\* \* \* \* \*